US010668776B2

(12) United States Patent
Kanenari (10) Patent No.: US 10,668,776 B2
(45) Date of Patent: Jun. 2, 2020

(54) NOISE REDUCTION APPARATUS AND PNEUMATIC TIRE PROVIDED WITH SAME (71) Applicant: The Yokohama Rubber Co., LTD., Minato-ku, Tokyo (JP)

(72) Inventor: Daisuke Kanenari, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 440 days.

(21) Appl. No.: 15/505,895

(22) PCT Filed: Aug. 10, 2015

(86) PCT No.: PCT/JP2015/072679
§ 371 (c)(1),
(2) Date: Feb. 22, 2017

(87) PCT Pub. No.: WO2016/027724
PCT Pub. Date: Feb. 25, 2016

(65) Prior Publication Data
US 2018/0215208 A1 Aug. 2, 2018

(30) Foreign Application Priority Data
Aug. 22, 2014 (JP) ................. 2014-169870

(51) Int. Cl.
B60B 19/00 (2006.01)
B60C 5/00 (2006.01)
(Continued)

(52) U.S. Cl.
CPC ........ B60C 19/002 (2013.01); B29D 30/0681 (2013.01); B60C 11/03 (2013.01); B60C 2011/0388 (2013.01)

(58) Field of Classification Search
CPC ..... B60C 19/002; B60C 19/12; B60C 19/122; B60C 19/125; B60C 5/00; B29D 30/0681; B29D 2030/0682; B29D 2030/0683
See application file for complete search history.

(56) References Cited

U.S. PATENT DOCUMENTS 3,949,796 A * 4/1976 Bartos ..................... B60C 17/06
152/158
7,854,244 B2 * 12/2010 Tanno .................. B60C 19/002
152/155
(Continued)

FOREIGN PATENT DOCUMENTS

DE          4001753 A1 *  7/1991  ............ B60C 19/00
DE   10 2009 024 454      12/2010
(Continued)

OTHER PUBLICATIONS

International Search Report for International Application No. PCT/JP2015/072679 dated Oct. 6, 2015, pages, Japan.

Primary Examiner — Edgardo San Martin
(74) Attorney, Agent, or Firm — Thorpe North & Western (57) ABSTRACT A noise reduction device (10) includes: a band member (11) made of a thermoplastic resin formed into a ring shape along a tire inner surface (5), and a sound absorbing member (12) made of a porous material bonded to the band member (11). The sound absorbing member (12) is arranged to be fitted onto the tire inner surface (5) with the help of the elastic restoring force of the band member (11). The band member (11) includes at least one rib (14) extending in the circumferential direction of the band member (11) on at least one surface in the thickness direction of the band member (11). The rib (14) is disposed so as to be present along the entire circumference of the band member (11).

9 Claims, 7 Drawing Sheets (51) Int. Cl.
 *B60C 19/00* (2006.01)
 *B29D 30/06* (2006.01)
 *B60C 11/03* (2006.01)

(56) References Cited

U.S. PATENT DOCUMENTS

| | | | | |
|---|---|---|---|---|
| 8,430,143 B2 * | 4/2013 | Tanno | ................... | B60C 19/002 152/155 |
| 8,448,743 B2 * | 5/2013 | Tanno | ................... | B60C 19/002 152/157 |
| 8,910,681 B2 * | 12/2014 | Tanno | ................... | B60C 19/002 152/157 |
| 10,384,494 B2 * | 8/2019 | Naruse | ................. | B60C 19/002 |
| 2006/0231185 A1 | 10/2006 | Tanno | | |
| 2009/0320980 A1 | 12/2009 | Tanno | | |
| 2010/0012243 A1 * | 1/2010 | Tanno | ................... | B60C 19/002 152/155 |
| 2010/0307655 A1 | 12/2010 | Tanno | | |
| 2011/0220264 A1 * | 9/2011 | Nagai | ................ | B29D 30/0654 152/548 |
| 2012/0000588 A1 * | 1/2012 | Tanno | ................ | B29D 30/0061 152/450 |
| 2012/0325383 A1 | 12/2012 | Moore et al. | | |
| 2013/0098522 A1 | 4/2013 | Tanno | | |
| 2013/0098533 A1 | 4/2013 | Tanno | | |

FOREIGN PATENT DOCUMENTS

| | | |
|---|---|---|
| DE | 10 2010 029 455 | 1/2011 |
| JP | 2006-306285 | 11/2006 |
| JP | 2006-341681 | 12/2006 |
| JP | 4175479 | 11/2008 |
| JP | 2010-280340 | 12/2010 |
| WO | WO 2005/012007 | 2/2005 |
| WO | WO 2006/118200 | 11/2006 |

\* cited by examiner

# NOISE REDUCTION APPARATUS AND PNEUMATIC TIRE PROVIDED WITH SAME

TECHNICAL FIELD

The present technology relates to a noise reduction device fitted onto a tire inner surface and a pneumatic tire provided with the same. More specifically, the present technology relates to a noise reduction device that makes it possible to save weight without failing to secure a sound absorbing member to the tire inner surface, and a pneumatic tire provided with the same.

BACKGROUND ART

One of the causes of the noises generated by a pneumatic tire is a cavernous resonance resulting from vibration of the air with which the tire is filled. When a tire is rolled, uneven road surfaces cause a tread portion to vibrate. The vibrations of the tread portion cause the air inside the tire to vibrate, which produces this cavernous resonance.

As a method for reducing noise caused by such cavernous resonance, providing a sound absorbing member within a cavity portion formed between the tire and the rim of the wheel has been proposed. More specifically, a noise reduction device is formed of a band member and a sound absorbing member, the band member being made of a thermoplastic resin formed into a ring shape along a tire inner surface and the sound absorbing member being made of a porous material and bonded to the band member. The sound absorbing member is installed in a region corresponding to the tread portion on a tire inner surface with the help of an elastic restoring force of the band member (refer to Japanese Patent No. 4175479 and International Patent Application Publication No. WO/2005/012007, for example).

Nevertheless, in the noise reduction device described above, a rigidity of the band member becomes inadequate when a thickness of the band member is reduced to save weight, resulting in the problem that the sound absorbing member cannot be firmly secured to the tire inner surface. Then, when the sound absorbing member is not secured to the tire inner surface in a stable manner, problems may arise such as deterioration in rim assemblability, or failure of the noise reduction device to follow the travel of the tire, resulting in an increased susceptibility to fracturing.

SUMMARY

The present technology provides a noise reduction device that makes it possible to save weight without failing to secure a sound absorbing member to a tire inner surface, and a pneumatic tire provided with the same.

To resolve the above problems, a noise reduction device according to the present technology includes a band member made of a thermoplastic resin formed into a ring shape along a tire inner surface, and a sound absorbing member made of a porous material bonded to the band member. The sound absorbing member is arranged to be fitted onto the tire inner surface with the help of an elastic restoring force of the band member. The band member includes at least one rib extending in a circumferential direction of the band member on at least one surface in a thickness direction of the band member. The rib is disposed so as to be present along an entire circumference of the band member.

Additionally, a pneumatic tire of the present technology is provided with the noise reduction device in a cavity portion thereof.

According to the present technology, the noise reduction device in which the sound absorbing member is arranged to be fitted onto the tire inner surface with the help of the elastic restoring force of the band member includes at least one rib extending in the circumferential direction of the band member on at least one surface in the thickness direction of the band member, the rib being disposed so as to be present along the entire circumference of the band member. This makes it possible to adequately ensure bending rigidity of the band member with the help of the rib even if the thickness of the band member is decreased. As a result, it is possible to save weight without failing to secure the sound absorbing member to the tire inner surface.

In the present technology, the rib preferably has a structure that continues across the entire circumference of the band member. When the rib is disconnected midway in the circumferential direction, stress concentrates in that section, making the band member susceptible to fracturing. The continuous structure of the rib makes it possible to avoid such stress concentrations and achieve a favorable reinforcement effect. Further, the rib may be formed by a plurality of rib pieces shorter than the circumference of the band member. In this case, the rib pieces adjacent in the circumferential direction of the band member are preferably disposed so as to overlap in the circumferential direction. This makes it possible to avoid, to the extent possible, concentrations of stress in areas where the rib is disconnected.

The rib is preferably disposed on the outer circumferential surface of the band member. This brings the rib into contact with the tire inner surface, while preventing the band member from coming into direct contact with the tire inner surface, thereby minimizing heat transfer from the tire inner surface to the band member and thus making it possible to minimize a reduction in the rigidity of the band member caused by heat.

When the rib is disposed on the outer circumferential surface of the band member, chamfering is preferably performed on a portion of the rib that comes into contact with the tire inner surface. This decreases the amount of damage to the tire inner surface caused by contact with the rib, making it possible to improve the durability of the pneumatic tire.

Circumferential changes in the height and the width of the rib are preferably no greater than 20% of the respective minimum values. When the circumferential changes in the height and the width of the rib are greater, the amount of change in rigidity in the circumferential direction of the band member increases, causing stress concentrations to more readily occur. Controlling these changes makes it possible to avoid such stress concentrations.

A total width of the rib is preferably from 2% to 30% of the width of the band member, and the height of the rib is preferably from 20% to 400% of the thickness of the band member. This makes it possible to adequately ensure the reinforcement effect of the band member with the help of the rib while favorably maintaining the durability of the band member.

DETAILED DESCRIPTION

Figure 1:
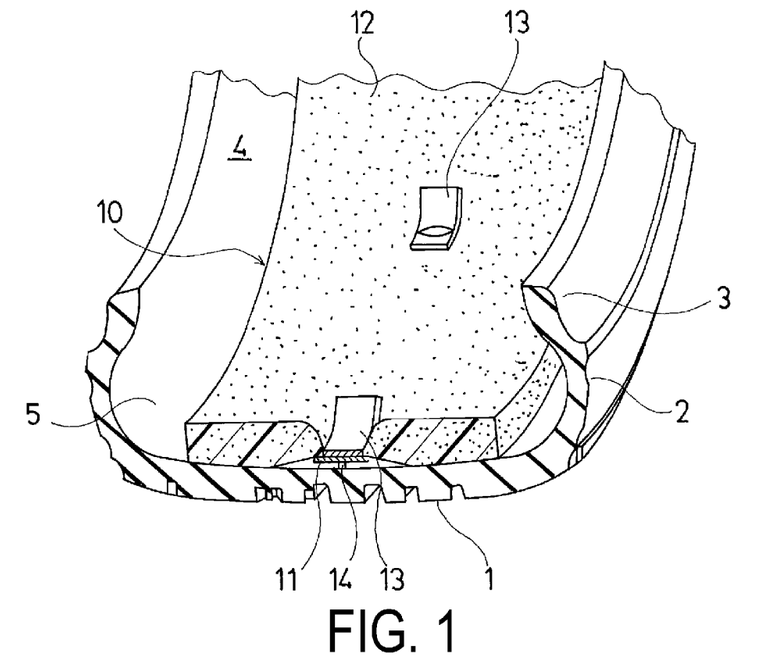
FIG. 1 is a perspective cross-sectional view illustrating a pneumatic tire provided with a noise reduction device according to an embodiment of the present technology.`
Figure 2:
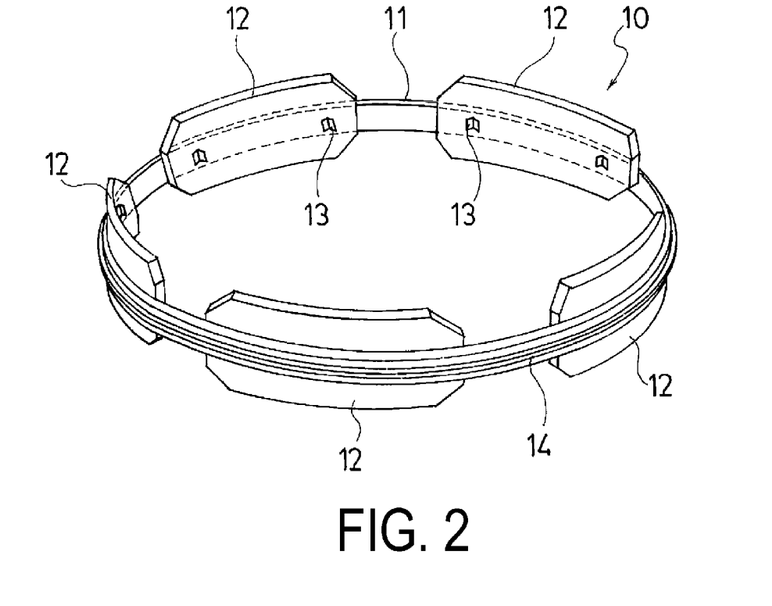
FIG. 2 is a perspective view illustrating the noise reduction device according to the embodiment of the present technology.

A configuration of the present technology will be described below in detail with reference to the accompanying drawings. FIG. 1 illustrates a pneumatic tire according to an embodiment of the present technology, and FIG. 2 illustrates a noise reduction device according to the embodiment of the present technology. As illustrated in FIG. 1, the pneumatic tire is provided with a tread portion 1 extending in a tire circumferential direction to form a ring shape, a pair of sidewall portions 2 disposed on both sides of the tread portion 1, and a pair of bead portions 3 disposed on inner sides in a tire radial direction of the sidewall portions 2. In addition, a noise reduction device 10 of a ring shape illustrated in FIG. 2 is fitted into a cavity portion 4 surrounded by the tread portion 1, the sidewall portions 2, and the bead portions 3. This noise reduction device 10 is disposed in a region of a tire inner surface 5 corresponding to the tread portion 1.

The noise reduction device 10 includes a band member 11 made of a thermoplastic resin, and a plurality of sound absorbing members 12 made of a porous material. The band member 11 is formed into a ring shape along the tire inner surface 5, and the sound absorbing members 12 are bonded to the band member 11 so as to be spaced apart from each other in the circumferential direction of the band member 11. The sound absorbing members 12 each include a number of inner cells, and have predetermined sound absorbing properties based on the porous structure. Polyurethane foam is preferably used as the porous material of the sound absorbing member 12. The band member 11 retains each of the sound absorbing members 12 on the tire inner surface 5 with the help of an elastic restoring force. The noise reduction device 10 thus configured is freely attachable to and detachable from a regular pneumatic tire, and easily attached and detached.

In the noise reduction device 10 described above, the method utilized to bond the band member 11 and each of the sound absorbing members 12 is thermal welding using a locking member 13 made of a thermoplastic resin. That is, the sound absorbing member 12 is disposed between the band member 11 and the locking member 13, both being made of a thermoplastic resin, and the locking member 13 is thermally welded to the band member 11 through the sound absorbing member 12. It is preferable that the constituent material of the band member 11 and the constituent material of the locking member 13 be the same type of thermoplastic resin, such as polypropylene, for example.

Figure 3A:
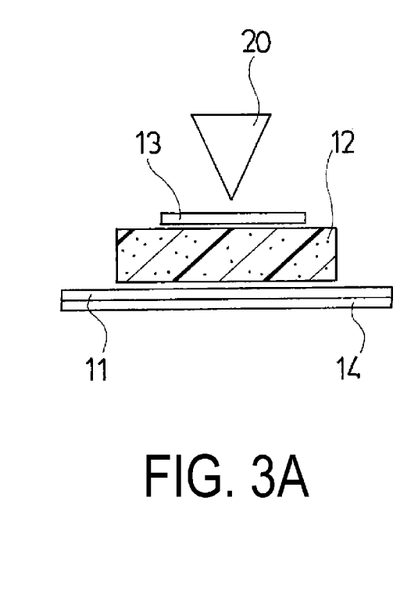
FIGS. 3A to 3C illustrate a method for bonding a sound absorbing member to a band member, each being a cross-sectional view of the corresponding step of the method.
Figure 3B:
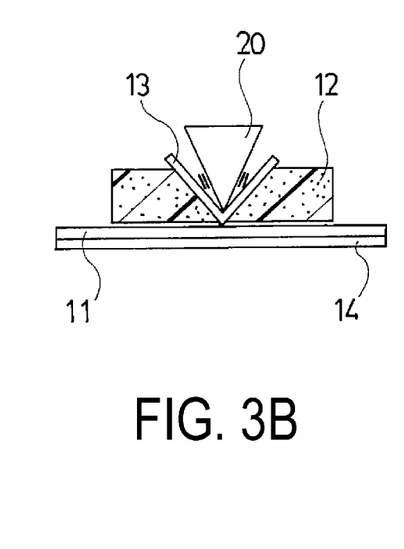
Figure 3C:
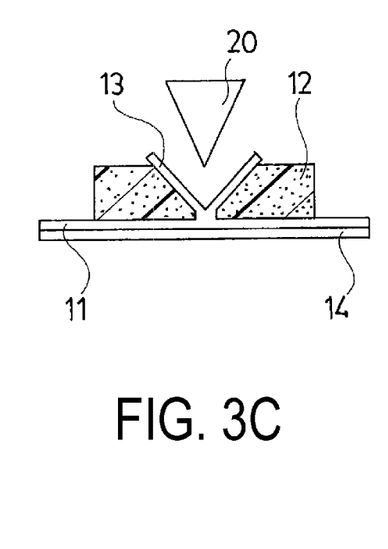

FIGS. 3A to 3C illustrate a method for bonding each of the sound absorbing members 12 to the band member 11. First, as illustrated in FIG. 3A, the sound absorbing member 12 is arranged between the band member 11 and the plate-shaped locking member 13. Next, as illustrated in FIG. 3B, a vibration horn 20 of an ultrasonic welding device is pressed onto the locking member 13 to bend the locking member 13, and the bent portion is locally heated. As a result, as illustrated in FIG. 3C, the locking member 13 and the band member 11 are thermally welded through the sound absorbing member 12. Thus, the sound absorbing members 12 are bonded to the band member 11 by the plurality of locking members 13. While such thermal welding as described above is preferably used as the method for bonding the band member 11 and each of the sound absorbing members 12, the bonding method is not particularly limited, and an adhesive may be used, for example.

In the noise reduction device 10 described above, at least one rib 14 (ridge) extending in the circumferential direction of the band member 11 is formed on at least one surface in a thickness direction of the band member 11, and disposed so as to be present along an entire circumference of the band member 11. In FIGS. 1 and 2, the rib 14 is disposed on an outer circumferential surface of the band member 11.

In the noise reduction device 10 configured so that the sound absorbing members 12 are arranged to be fitted onto the tire inner surface 5 with the help of the elastic restoring force of the band member 11 as described above, at least one rib 14 extending in the circumferential direction of the band member 10 is provided on at least one surface in the thickness direction of the band member 11, and disposed so as to be present along the entire circumference of the band member 11, thereby making it possible to adequately ensure bending rigidity of the band member 11 with the help of the rib 14 even if the thickness of the band member 11 is decreased. This configuration makes it possible to save weight of the noise reduction device 10 without failing to secure the sound absorbing member 12 to the tire inner surface 5.

In particular, when the rib 14 is disposed on the outer circumferential surface of the band member 11, the rib 14 comes into contact with the tire inner surface 5 while the band member 11 does not come into direct contact with the tire inner surface 5. This minimizes heat transfer from the tire inner surface 5 to the band member 11, making it possible to minimize a reduction in rigidity of the band member 11 caused by heat.

In the noise reduction device 10 described above, the rib 14 preferably has a structure that continues across the entire circumference (longitudinal direction) of the band member 11, as illustrated in FIGS. 4A to 8B. When the rib 14 is disconnected midway in the circumferential direction, stress concentrates in that section, making the band member 11 susceptible to fracturing. The continuous structure of the rib 14 makes it possible to avoid such stress concentrations and achieve a favorable reinforcement effect. Note that, when both end portions of a band-like member are bonded to form the ring-shaped band member 11, the rib 14 may be unavoidably discontinuous in the bonded portion (spliced portion). In such a case, it is only required that the rib 14 have a structure that continues across regions excluding the spliced portion of the band member 11. The spliced portion of the band member 11 can be reinforced as necessary.

Figure 4A:
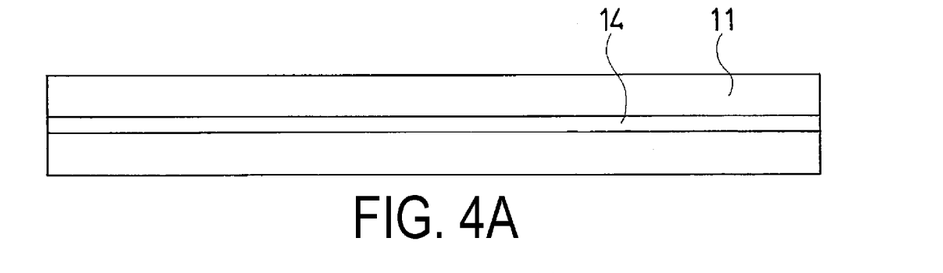
FIGS. 4A and 4B illustrate an example of the band member used in the present technology, FIG. 4A being a development view of the band member extended on a plane and FIG. 4B being a transverse cross-sectional view thereof.
Figure 4B:
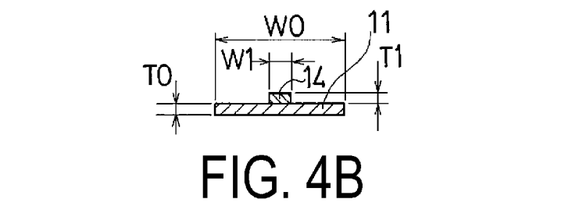

In FIGS. 4A and 4B, one rib 14 having a structure that continues across the entire circumference (longitudinal direction) of the band member 11 is formed on one surface of the band member 11. The rib 14 extends linearly in the circumferential direction of the band member 11.

Figure 5A:
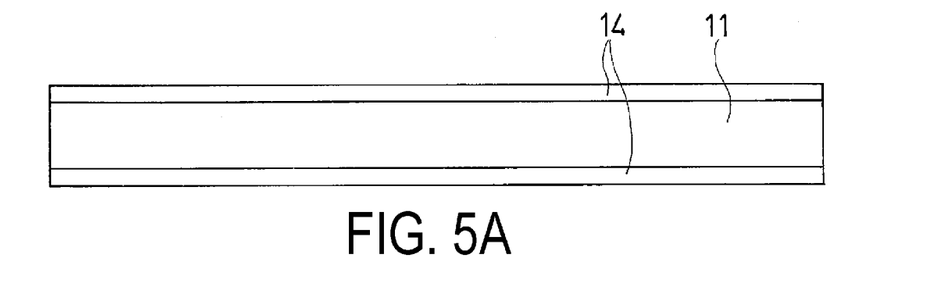
FIGS. 5A and 5B illustrate a modified example of the band member used in the present technology, FIG. 5A being a development view of the band member extended on a plane and FIG. 5B being a transverse cross-sectional view thereof.
Figure 5B:
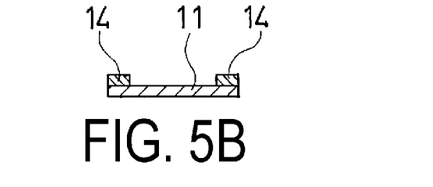

In FIGS. 5A and 5B, two ribs 14 each having a structure that continues across the entire circumference (longitudinal direction) of the band member 11 are formed on one surface of the band member 11. The ribs 14 extend linearly in the circumferential direction of the band member 11 at both end portions in a width direction of the band member 11. Such an embodiment makes it possible to effectively reinforce the band member 11, and, in addition, making the two ribs 14 come into contact with the tire inner surface 5 enables the band member 11 to be installed in a stable state.

Figure 6A:
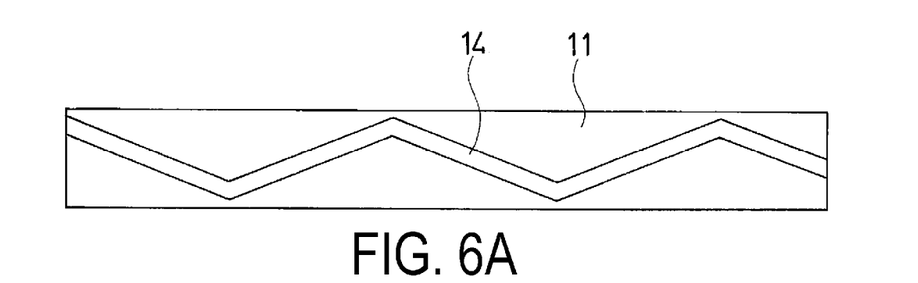
FIGS. 6A and 6B illustrate another modified example of the band member used in the present technology, FIG. 6A being a development view of the band member extended on a plane and FIG. 6B being a transverse cross-sectional view thereof.
Figure 6B:
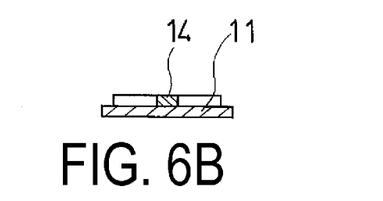

In FIGS. 6A and 6B, one rib 14 having a structure that continues across the entire circumference (longitudinal direction) of the band member 11 is formed on one surface of the band member 11. The rib 14 extends in a zigzag shape in the circumferential direction of the band member 11. The rib 14 that thus extends in the zigzag shape comes into contact with the tire inner surface 5, enabling the band member 11 to be installed in a stable state.

Figure 7A:
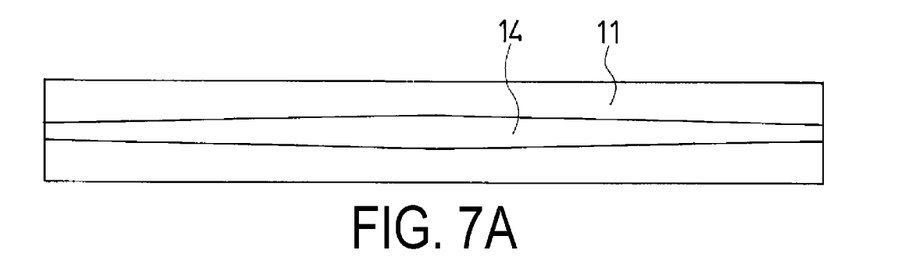
FIGS. 7A and 7B illustrate another modified example of the band member used in the present technology, FIG. 7A being a development view of the band member extended on a plane and FIG. 7B being a transverse cross-sectional view thereof.
Figure 7B:
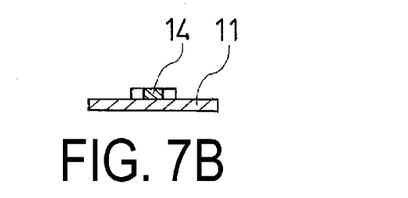
Figure 8A:
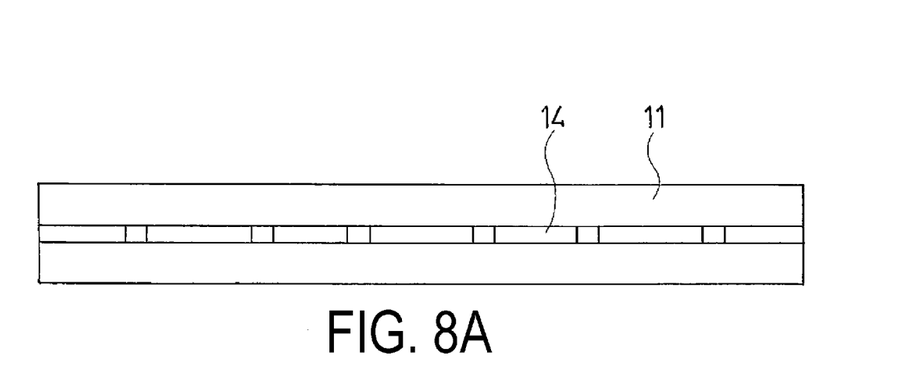
FIGS. 8A and 8B illustrate another modified example of the band member used in the present technology, FIG. 8A being a development view of the band member extended on a plane and FIG. 8B being a side view thereof.
Figure 8B:
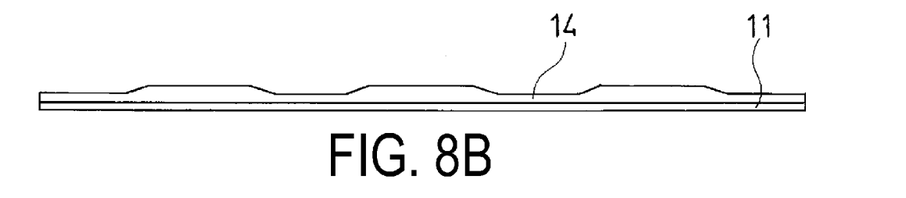

In FIGS. 7A and 7B, one rib 14 having a structure that continues across the entire circumference (longitudinal direction) of the band member 11 is formed on one surface of the band member 11. The rib 14 changes in width along the circumference of the band member 11. Further, in FIGS. 8A and 8B, one rib 14 having a structure that continues across the entire circumference (longitudinal direction) of the band member 11 is formed on one surface of the band member 11. The rib 14 changes in height along the circumference of the band member 11. When the rib 14 changes in either height or width along the circumference, the circumferential changes (difference between a minimum value and a maximum value) in the height and the width of the rib 14 are preferably no greater than 20% of the respective minimum values and more preferably no greater than 10%. Most preferably, the height and the width of the rib 14 are constant along the circumference of the band member 11. When the circumferential changes in the height and the width of the rib are greater, the change in rigidity in the circumferential direction of the band member 11 increases, causing stress concentrations to more readily occur. Controlling these changes makes it possible to avoid such stress concentrations. This contributes to an improvement in a durability of the band member 11.

A total width W1 of the rib 14 is preferably from 2% to 30% of a width W0 of the band member 11, and a height T1 of the rib 14 is preferably from 20% to 400% of a thickness T0 of the band member 11 (refer to FIGS. 4A and 4B). When the band member 11 includes one rib 14, the width of the one rib 14 is the total width W1. When the band member 11 includes a plurality of the ribs 14, the total of the widths of the plurality of ribs 14 is the total width W1. Setting the total width W1 and the height T1 of the rib 14 within the above ranges makes it possible to adequately ensure the reinforcement effect of the band member 11 with the help of the rib 14 while favorably maintaining the durability of the band member 11. Here, when the total width W1 of the rib 14 is too small, the reinforcement effect is inadequate. Conversely, when the total width W1 is too large, the bending rigidity becomes excessive, decreasing the durability. Further, when the height T1 of the rib 14 is too small, the reinforcement effect is inadequate. Conversely, when the height T1 is too large, the bending rigidity becomes excessive, decreasing the durability. Further, when the rib 14 is disposed on the outer circumferential surface of the band member 11 and the height T1 of the rib 14 is too large, the sound absorbing member 12 is largely separated from the tire inner surface 5 and the sound absorbing member 12 becomes susceptible to deformation in association with travel, making the sound absorbing member 12 susceptible to damage.

Note that the width W0 of the band member 11 is preferably set in the range of from 15 mm to 70 mm, and the thickness T0 of the band member 11 is preferably set in the range of from 0.7 mm to 3.0 mm. This makes it possible to firmly retain the sound absorbing member 12 of the noise reduction device 10 on the tire inner surface of the pneumatic tire. Here, when the width W0 or the thickness T0 of the band member 11 is too small, the strength of the band member 11 is inadequate. Conversely, when the width W0 or the thickness T0 is too large, the bending rigidity becomes excessive, decreasing the durability.

In the noise reduction device 10 described above, the rib 14 may include a plurality of rib pieces 14X shorter than the circumference of the band member 11, as illustrated in FIGS. 9A to 11B. In this case, the rib pieces 14X, 14X adjacent in the circumferential direction (longitudinal direction) of the band member 11 are preferably disposed so as to overlap in the circumferential direction. This makes it possible to avoid, to the extent possible, concentrations of stress in areas where the rib 14 is disconnected.

Figure 9A:
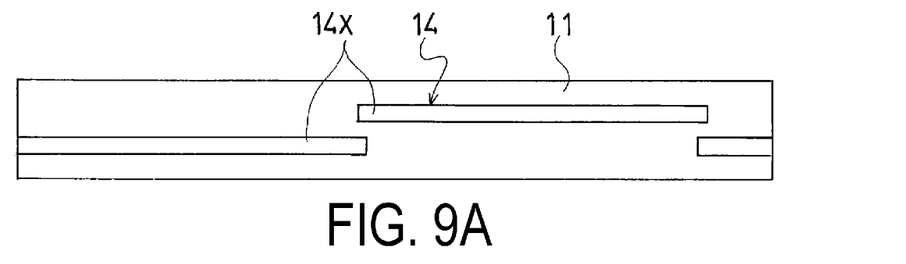
FIGS. 9A and 9B illustrate another modified example of the band member used in the present technology, FIG. 9A being a development view of the band member extended on a plane and FIG. 9B being a transverse cross-sectional view thereof.
Figure 9B:
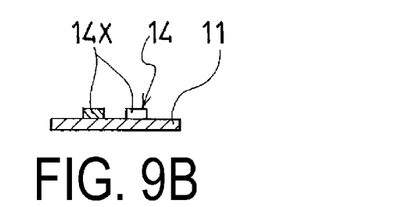

In FIGS. 9A and 9B, the rib 14 formed by the plurality of rib pieces 14X is formed on one surface of the band member 11, and the rib pieces 14X, 14X adjacent in the circumferential direction (longitudinal direction) of the band member 11 are disposed so as to overlap in the circumferential direction. The rib pieces 14X are separately disposed in two locations in the width direction of the band member 11, and extend parallel to the longitudinal direction of the band member 11.

Figure 10A:
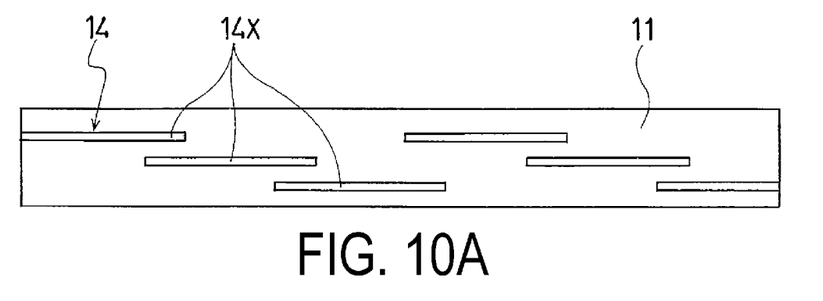
FIGS. 10A and 10B illustrate another modified example of the band member used in the present technology, FIG. 10A being a development view of the band member extended on a plane and FIG. 10B being a transverse cross-sectional view thereof.
Figure 10B:
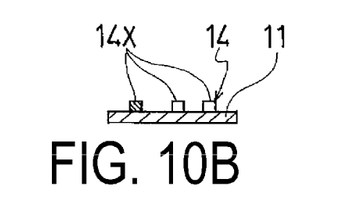

In FIGS. 10A and 10B, the rib 14 formed by the plurality of rib pieces 14X is formed on one surface of the band member 11, and the rib pieces 14X, 14X adjacent in the circumferential direction (longitudinal direction) of the band member 11 are disposed so as to overlap in the circumferential direction. The rib pieces 14X are separately disposed in three locations in the width direction of the band member 11, and extend parallel to the longitudinal direction of the band member 11.

Figure 11A:
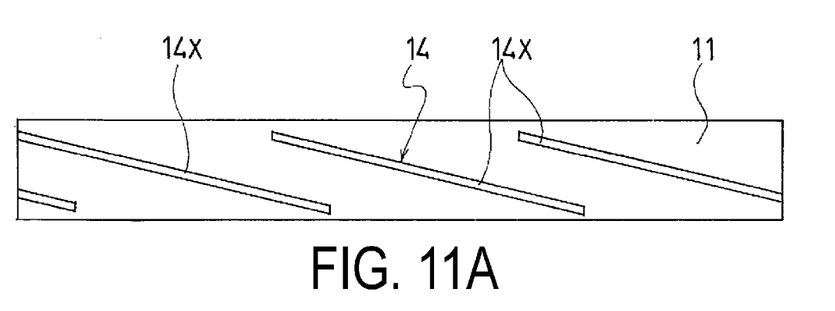
FIGS. 11A and 11B illustrate another modified example of the band member used in the present technology, FIG. 11A being a development view of the band member extended on a plane and FIG. 11B being a transverse cross-sectional view thereof.
Figure 11B:
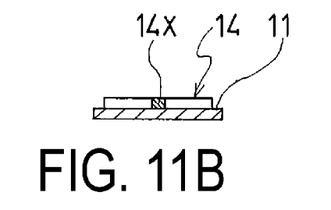

In FIGS. 11A and 11B, the rib 14 formed by the plurality of rib pieces 14X is formed on one surface of the band member 11, and the rib pieces 14X, 14X adjacent in the circumferential direction (longitudinal direction) of the band member 11 are disposed so as to overlap in the circumferential direction. Each of the rib pieces 14X inclines with respect to the longitudinal direction of the band member 11.

In the embodiments of FIGS. 9A to 11B, the amount of overlap between the rib pieces 14X in the tire circumferential direction is not particularly limited. However, an excessive amount of overlap causes the bending rigidity of the band member 11 in its entirety to be excessive and leads to increases in weight. Thus, the amount of overlap between the rib pieces 14X in the tire circumferential direction is preferably minimized. For example, the total amount of overlap between the rib pieces 14X in the tire circumferential direction is preferably regulated to no greater than 30% of the circumference of the band member 11.

Figure 12:
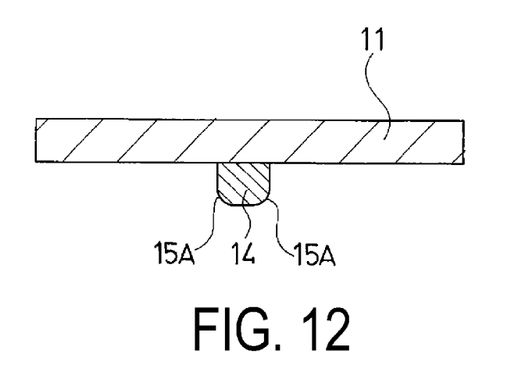
FIG. 12 is a transverse cross-sectional view illustrating another modified example of the band member used in the present technology.
Figure 13:
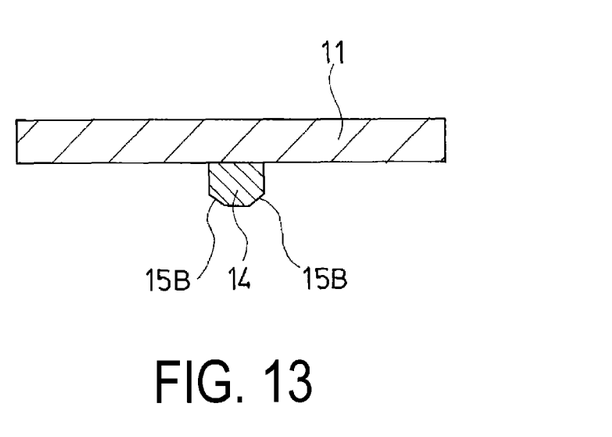
FIG. 13 is a transverse cross-sectional view illustrating another modified example of the band member used in the present technology.

When the rib 14 is disposed on the outer circumferential surface of the band member 11 of the noise reduction device 10 described above, it is preferable to chamfer a portion of the rib 14 that comes into contact with the tire inner surface 5. In FIG. 12, a chamfered portion 15A formed by a curved surface having a predetermined radius of curvature is formed at a portion of the rib 14 that comes into contact with the tire inner surface 5. Further, in FIG. 13, a chamfered portion 15B formed by a flat surface is formed at a portion of the rib 14 that comes into contact with the tire inner surface 5. This decreases the amount of damage to the tire inner surface 5 caused by contact with the rib 14, making it possible to improve the durability of the pneumatic tire.

Examples

Noise reduction devices of Conventional Example, Comparative Examples 1 and 2, and Working Examples 1 to 6 were manufactured. Each of the noise reduction devices included a band member made of a thermoplastic resin formed into a ring shape along a tire inner surface, and a sound absorbing member made of a porous material bonded to the band member. Each of the sound absorbing members was arranged to be fitted onto the tire inner surface with the help of the elastic restoring force of the band member. Each of the band members was given a different configuration. These noise reduction devices are suitable for a pneumatic tire of a tire size of 245/40R18.

In Conventional Example, the width of the band member was 20 mm, and the thickness of the band member was 1.0 mm. In Comparative Example 1, the width of the band member was 20 mm, and the thickness of the band member was 0.8 mm. In Comparative Example 2, the width of the band member was 20 mm, the thickness of the band member was 0.8 mm, and a rib extending in the circumferential direction of the band member was provided to the outer circumferential surface of the band member. The rib was formed by 15 rib pieces shorter than the circumference of the band member. These rib pieces were disposed separately from each other in the circumferential direction to occupy a region equivalent to 90% of the band member in the circumferential direction.

In Working Examples 1 to 4, the width of the band member was 20 mm, the thickness of the band member was from 0.6 to 0.8 mm, and one rib (refer to FIGS. 4A and 4B) continuously extending in the circumferential direction of the band member was provided to the outer circumferential surface of the band member. In each of Working Examples 1 to 4, the rib was disposed so as to be present along the entire circumference of the band member, and given a different width and height.

In Working Example 5, the width of the band member was 20 mm, the thickness of the band member was 0.5 mm, and two ribs (refer to FIGS. 5A and 5B) continuously extending in the circumferential direction of the band member were provided to the outer circumferential surface of the band member. The ribs were disposed so as to be present along the entire circumference of the band member. The width of the each of the ribs was 2 mm.

In Working Example 6, the width of the band member was 20 mm, the thickness of the band member was 0.8 mm, and a rib extending in the circumferential direction of the band member was provided to the outer circumferential surface of the band member. The rib was formed by 15 rib pieces (refer to FIGS. 11A and 11B) shorter than the circumference of the band member. These rib pieces adjacent in the circumferential direction of the band member were disposed so as to overlap in the circumferential direction, which causes the rib to be present along the entire circumference of the band member. These rib pieces were disposed obliquely to the circumferential direction of the band member, and the width of each of the rib pieces was 1 mm.

The noise reduction devices of Conventional Example, Comparative Examples 1 and 2, and Working Examples 1 to 6 described above were evaluated for retention performance of the sound absorbing member, durability, and band weight in accordance with the evaluation methods below. Results are shown in Table 1.

Retention Performance of Sound Absorbing Member:

Each of the noise reduction devices was fitted into the cavity portion of a pneumatic tire, and examined for retention performance of the sound absorbing member to the tire inner surface. The evaluation result was indicated as A in a case where the rigidity of the band member was adequate and the sound absorbing member was firmly retained on the tire inner surface, B in a case where the sound absorbing member was retained on the tire inner surface with the help of the rigidity of the band member, and C in a case where the rigidity of the band member was inadequate and the sound absorbing member was not retained and fell off the tire inner surface.

Durability:

Each of the noise reduction devices was fitted into the cavity portion of a pneumatic tire with a tire size of 245/40R18. Each pneumatic tire was then assembled to a wheel having a rim size of 18×9 JJ, and a traveling test was conducted under the conditions of an air pressure of 250 kPa, a load of 4.8 kN, and a speed of 80 km/h using an indoor drum testing machine. The travel distance until the noise reduction device became defective was measured. The noise reduction device that achieved a travel distance of at least 20,000 km was determined as having passed the test. The evaluation result was indicated as S in a case where the travel distance was at least 2 times the distance defined as the pass criterion, A in a case where the travel distance was at least 1.5 times the distance defined as the pass criterion, B in a case where the travel distance was at least the distance defined as the pass criterion, and C in a case where travel distance was less than the distance defined as the pass criterion.

Band Weight:

The weight of the band member of each of the noise reduction devices was measured and evaluated by indexing the measurement results with Conventional Example as the standard score (100). Smaller index values indicate lighter weight.

TABLE 1

|  | Conventional Example | Comparative Example 1 | Working Example 1 | Working Example 2 | Working Example 3 |
|---|---|---|---|---|---|
| Band member width (mm) | 20 | 20 | 20 | 20 | 20 |
| Band member thickness (mm) | 1.0 | 0.8 | 0.8 | 0.8 | 0.8 |
| No. of ribs or rib pieces | 0 | 0 | 1 | 1 | 1 |
| Rib width (mm) | — | — | 1 | 1 | 6 |
| (Ratio) |  |  | (5%) | (5%) | (30%) |
| Rib height (mm) | — | — | 1 | 2.4 | 0.4 |
| (Ratio) |  |  | (125%) | (300%) | (50%) |
| Retention performance of sound absorbing member | B | C | B | A | A |
| Durability | B | — | B | A | A |
| Band weight (index) | 100 | 80 | 85 | 92 | 92 |

|  | Working Example 4 | Working Example 5 | Working Example 6 | Comparative Example 2 |
|---|---|---|---|---|
| Band member width (mm) | 20 | 20 | 20 | 20 |
| Band member thickness (mm) | 0.6 | 0.5 | 0.8 | 0.8 |
| No. of ribs or rib pieces | 1 | 2 | 15 | 15 |
| Rib width (mm) | 2 | 2 | 1 | 2 |
| (Ratio) | (10%) | (10%) | (5%) | (10%) |
| Rib height (mm) | 2.4 | 2 | 2.4 | 1 |
| (Ratio) | (400%) | (400%) | (300%) | (125%) |
| Retention performance of sound absorbing member | A | A | A | B |
| Durability | A | S | A | C |
| Band weight (index) | 84 | 90 | 98 | 89 |

As shown in Table 1, in the noise reduction devices of Working Examples 1 to 6, weight was saved compared to Conventional Example, and the retention performance of the sound absorbing member as well as durability were favorable. In contrast, in Comparative Example 1, the band member was thinned without any ribs, resulting in failure to retain the sound absorbing member on the tire inner surface, and thus failure to evaluate durability. Further, in Comparative Example 2, ribs intermittently extending in the circumferential direction of the band member were provided to the outer circumferential surface of the band member to occupy a region equivalent to 90% of the band member in the circumferential direction, resulting in inadequate durability of the noise reduction device.

The invention claimed is:

1. A noise reduction device comprising:
   a band member made of a thermoplastic resin formed into a ring shape along a tire inner surface; and
   a sound absorbing member made of a porous material bonded to the band member, the sound absorbing member being arranged to be fitted onto the tire inner surface using an elastic restoring force of the band member;
   the band member comprising at least one rib extending in a circumferential direction of the band member on at least one surface in a thickness direction of the band member;
   the rib being disposed so as to be present along an entire circumference of the band member; and
   a height of the rib varying along the circumferential direction of the band member.

2. The noise reduction device according to claim 1, wherein the rib has a structure that continues across the entire circumference of the band member.

3. The noise reduction device according to claim 1, wherein the rib is formed by a plurality of rib pieces shorter than the circumference of the band member, the rib pieces adjacent in the circumferential direction of the band member being disposed so as to overlap in the circumferential direction.

4. The noise reduction device according to claim 1, wherein the rib is disposed on an outer circumferential surface of the band member.

5. The noise reduction device according to claim 4, wherein chamfering is performed on a portion of the rib that comes into contact with the tire inner surface.

6. The noise reduction device according to claim 1, wherein circumferential changes in the height and a width of the rib are no greater than 20% of respective minimum values.

7. The noise reduction device according to claim 1, wherein a total width of the rib is from 2% to 30% of a width of the band member, and a height of the rib is from 20% to 400% of a thickness of the band member.

8. A pneumatic tire comprising the noise reduction device described in claim 1 arranged in a cavity portion.

9. The noise reduction device according to claim 1, wherein the sound absorbing member is disposed between the band member and a locking member, the locking member being thermally welded to the band member through the sound absorbing member.

\* \* \* \* \*